United States Patent [19]

Ballantyne et al.

[11] Patent Number: 4,836,125
[45] Date of Patent: Jun. 6, 1989

[54] ANCHORING SYSTEM FOR FLOATING STRUCTURE

[75] Inventors: Ronald Ballantyne, Burlington; Martin Murray, Toronto, both of Canada

[73] Assignee: John T. Hepburn Limited, Mississauga, Canada

[21] Appl. No.: 208,785

[22] Filed: Jun. 16, 1988

Related U.S. Application Data

[63] Continuation of Ser. No. 59,768, Jun. 8, 1987, abandoned, which is a continuation of Ser. No. 911,673, Sep. 25, 1986, abandoned, which is a continuation of Ser. No. 773,611, Sep. 9, 1985, abandoned.

[30] Foreign Application Priority Data

May 10, 1985 [CA] Canada ................................ 481238

[51] Int. Cl.$^4$ ............................................. F16G 15/08
[52] U.S. Cl. .......................................... 114/294; 59/93
[58] Field of Search ............... 114/230, 293, 294, 210, 114/268, 179; 59/85, 86, 93, 95; 254/371, 372, 333; 405/224

[56] References Cited

U.S. PATENT DOCUMENTS 3,985,093 10/1976 Eidem ...................................... 59/93
4,497,471 2/1985 Longberg et al. .................. 114/230

Primary Examiner—Joseph F. Peters, Jr.
Assistant Examiner—Edwin L. Swinehart
Attorney, Agent, or Firm—Sim & McBurney

[57] ABSTRACT

An anchoring system for semisubmersible drill rigs is described which includes a wire rope-chain cable anchor line and in which system components co-operate to convey the junction of the wire rope and chain cable smoothly over a fairlead sheave. The connector joining the anchor line has a narrow end in which the rope is rigidly retained, a large end at which a chain end link is pivotally retained, and a radially symmetric, generally concave surface extending between the two connector ends. The outer surface of the connector is shaped to seat against the central hub of the fairlead sheave in a predetermined orientation in which a limited fixed bend angle is formed between the connector and the wire rope. The geometry of the connector naturally biases the connector to seat against the central hub of the fairlead sheave in the predetermined orientation during hauling in of the anchor line. A collar fitted about the penultimate chain link displaces the large connector end from the sheave during paying out of the anchor line until the outer connector surface can be drawn by the wire rope into engagement with the sheave. Wire rope bending is accordingly minimized without significantly enlarging or altering the size of the fairlead sheave.

5 Claims, 4 Drawing Sheets

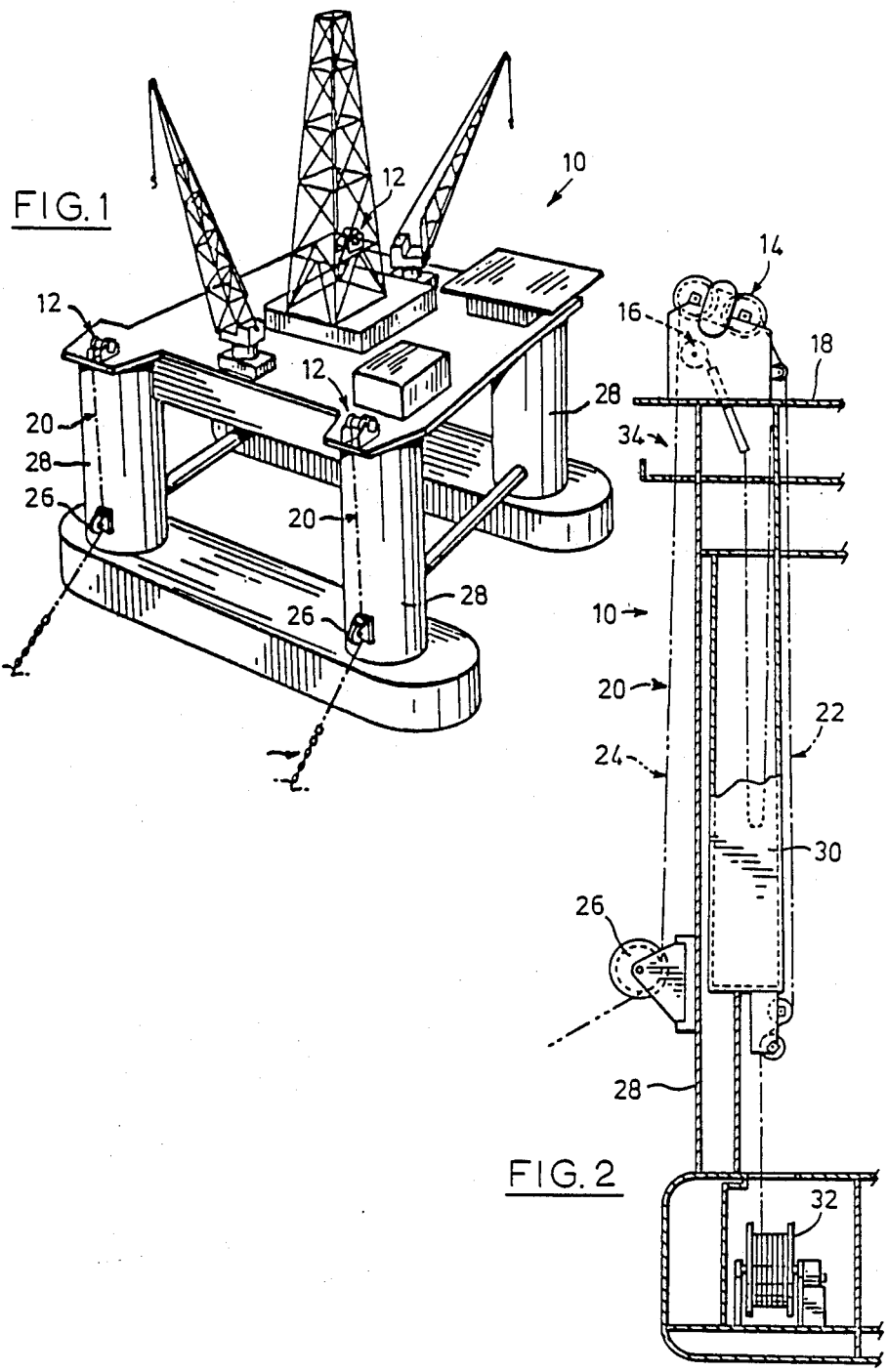

ANCHORING SYSTEM FOR FLOATING STRUCTURE

This application is a continuation of application Ser. No. 059,768 filed June 8, 1987, now abandoned, which is a continuation of application Ser. No. 911,673 filed on Sept. 25, 1986, which is a continuation of patent application Ser. No. 773,611 filed on Sept. 9, 1985, now abandoned.

FIELD OF THE INVENTION

The invention relates generally to anchoring systems, and more specifically to anchoring systems adapted to handle combination anchor lines consisting of wire rope and chain cable, such as are commonly used to moor offshore drilling platforms in deep waters.

BACKGROUND OF THE INVENTION

The advantages of using a combination anchor line consisting of a lower length of chain cable serially connected to an upper length of wire rope in the mooring of offshore drill platforms and the like are well known. In particular, better anchoring characteristics at certain water depths can be achieved than otherwise possible through use of wire rope or chain alone, and an overall capability of mooring in deeper waters is obtained. Use of combination anchor lines, however, introduced several problems not encountered in prior systems.

In particular, it is clearly desirable to haul in and pay out the anchor line to the extent possible from the deck of the anchored structure, using winches and windlasses appropriately mounted on the structure. Such operation requires, however, the conveying of a wire rope-chain cable connector over a fairlead sheave attached to the structure without unduly bending the wire rope. In original combination anchoring systems the problem of conveying the junction of the wire rope and chain over a fairlead sheave was avoided by breaking the wire rope-chain cable connection on the deck of a workboat, accompanying the floating structure, and either storing the chain cable in the workboat or conveying the chain cable for storage to the deck of the floating structure without engaging the fairlead sheave. Such practice was inconvenient and hazardous in rough waters.

In U.S. Pat. No. 3,842,776 which issued to Wudtke on Oct. 22, 1974, an anchoring system is described in which a special wire rope-chain cable connector serves to convey the junction between wire rope and chain cable over a fairlead sheave. The connector is formed with an enlarged part-spherical end which is conveyed in a mating outermost groove of a special fairlead sheave during transition from wire rope to chain cable. The point of connection of the chain end link with the connector is sufficiently close to the rotational centre of the connector's part-spherical surface and the connector is sufficiently distant from the hub of the sheave that the rope end of the connector pivots freely in response to rope movement, thereby reducing rope bending. Although successfully implemented, such a system has the notable disadvantage that the special fairlead sheave must be considerably larger than a convention fairlead sheave, and consequently very cumbersome and heavy.

It is an object of the present invention to provide an anchoring system which conveys wire rope and chain cable over a fairlead sheave without undue bending of the wire rope and which does not require an oversized fairlead sheave.

BRIEF SUMMARY OF THE INVENTION

In one aspect, the invention provides an anchoring system for a floating structure which includes an anchor, an anchor line formed of chain cable and wire rope, a fairlead sheave mounted on the floating structure, and appropriate winch and windlass means for hauling in and paying out the anchor line over the fairlead sheave. The fairlead sheave may be of generally conventional construction for such applications, having a central hub which includes a wire rope groove and a broad groove surrounding the wire rope groove (for conveying chain links), and having a pair of circumferential flanges which extend radially outwardly from opposing sides of the broad groove.

The connector has a narrow end portion in which an end of the rope is rigidly retained (in, for example, a conventional socket connection), and a large end portion at which an end link of the chain cable is pivotally retained (as with a conventional curved crossbar). The connector is shaped to seat against the central hub in a predetermined orientation in which a predetermined bend angle is formed between the connector and the wire rope groove, whenever the outer surface portion of the connector extending between the narrow and large connector end portions engages the broad groove. Because of the provision of a comparatively narrow connector end portion for receipt of the rope, the connector is biased to seat against the broad groove in the predetermined orientation during the customary hauling in of the anchor line.

Biasing means are provided to bias movement of the connector relative to the fairlead sheave to ensure that the connector seats against the broad groove in the required orientation, particularly when the anchor line is payed out, when there is otherwise a substantial likelihood that the connector would lock against the fairlead sheave in an orientation which would cause severe bending (which problem will be more apparent from the materials following). This biasing means includes a collar fitted about the chain cable a predetermined distance from the connector and dimensioned to maintain the large connector end portion diplaced from the broad groove of the fairlead sheave during initial engagement of the collar with the sheave and the approach of the connector. As a result, the outer surface portion of the connector is drawn by the wire rope into engagement with the fairlead sheave, as the rope approaches the sheave.

DESCRIPTION OF THE DRAWINGS

The invention will be better understood with reference to drawings illustrating a preferred embodiment, in which:

FIG. 1 is a perspective view illustrating a semisubmersible drill platform;

FIG. 2 is a fragmented side elevational view of a corner of the drill platform illustrating components of an anchoring system embodying the invention;

DESCRIPTION OF PREFERRED EMBODIMENT

Figure 3A:
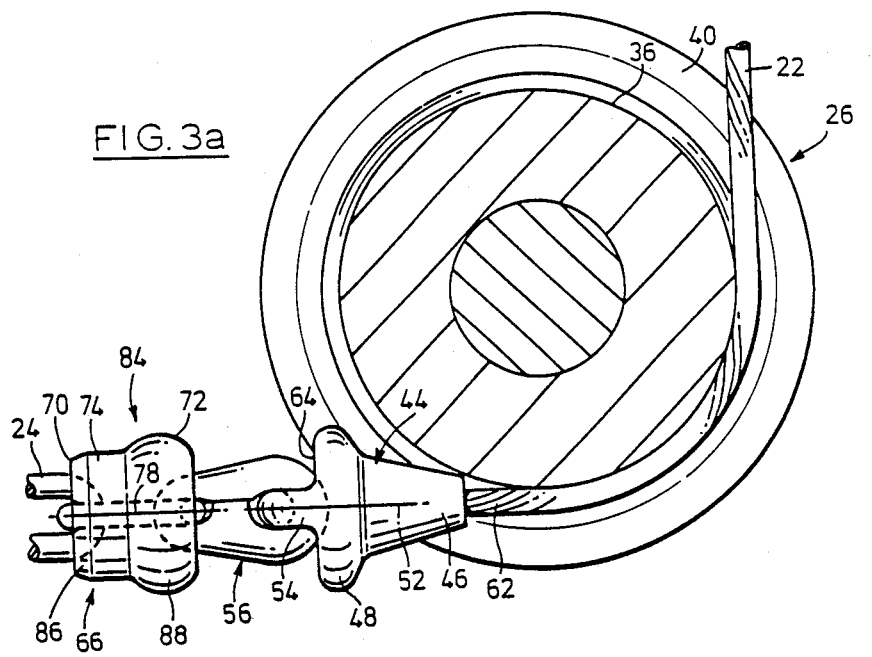
FIGS. 3a–3c are elevational views showing wire rope-chain cable connecting structure cooperating with a system fairlead sheave (shown in cross-section); and, FIG. 4 is a fragmented perspective view of a rope-chain connector seated on the central hub of the system fairlead sheave.

Reference is made to FIG. 1 which illustrates a semisubmersible drill rig 10 which incorporates two anchoring systems embodying the present invention at each corner. One such anchoring system generally indicated by the reference numeral 12 is more specifically detailed in the view of FIG. 2. The anchoring system 12 includes a traction winch 14 and windlass 16 mounted side-by-side on the deck 18 of the drill rig 10. These serve to haul in and pay out a combination anchor line 20 which includes an upper length of wire rope 22 serially connected to a lower length of chain cable 24, the chain cable 24 being terminated with an appropriate anchor (not illustrated in FIG. 2). The anchor line 20 is hauled in and payed out by the winch 14 and windlass 16 over a fairlead sheave 26, fixed to a leg 28 of the drill rig 10, which guides the anchor line 20 to and from the drill rig 10. A chain locker 30 is provided in the leg 28 for storage of the chain, and a conventional storage winch 32 is positioned in the foot of the leg 28 to collect wire rope hauled in by the traction winch 14.

The anchoring system 12 is of the disconnect type. Basically, during retrieval of the anchor line 20, the wire rope 22 is hauled in by the traction winch 14 until the wire rope-chain cable junction is accessible at a work station 34 below the deck 18 of the vessel. There, the load of the chain cable 24 is transferred to the windlass 16, the wire rope-chain cable junction broken, and the cable hauled in by the windlass 16 into the chain locker 30. The general components of the anchoring system 12 are conventional, as is the general method of paying out and retrieving the anchor line 20 and consequently will not be described in detail.

The more relevant apsects of the present invention, relating to guiding of the wire rope-chain cable junction over the fairlead sheave 26, are illustrated in greater detail in the view of FIGS. 3a-3c and FIG. 4. In particular, it will be apparent from the view of FIG. 4 that the fairlead sheave 26 has a central hub which is formed with a circumferential wire rope groove 36 having a predetermined groove diameter, selected accordingly to well known principles, to be at least fifteen times the diameter of the wire rope 22, thereby avoiding excessive rope bending. The wire rope groove 36 is surrounded by a broad groove 38 whose function is to convey the chain cable 24. The chain cable 24 travels "flat" against the broad groove 38 with alternate links extending into the wire rope groove 36. A pair of opposing circumferential flanges 40, 42 extend radially outwardly one from with side of the broad groove 38, and ensure that the anchor line 20 remains in engagement with the wire rope groove 36 or the broad groove 38, but are not actively involved in conveying of the anchor line.

A socketed connector 44 is provided to join the wire rope 22 to the chain cable 24. The connector has a narrow end portion 46, a large end portion 48, and a circumferential, concave curvilinear outer surface portion 50 which is radially symmetric about a longitudinal axis 52 extending through the narrow and large connector end portions 46, 48. The wire rope is received through a central passage extending longitudinally through the connector 44, and is rigidly retained in the narrow end portion 46 by means of a conventional socketed connection. A curved crossbar 54 adjacent the large connector end portion 48 receives and pivotally retains a detachable end chain link 56.

Figure 3B:
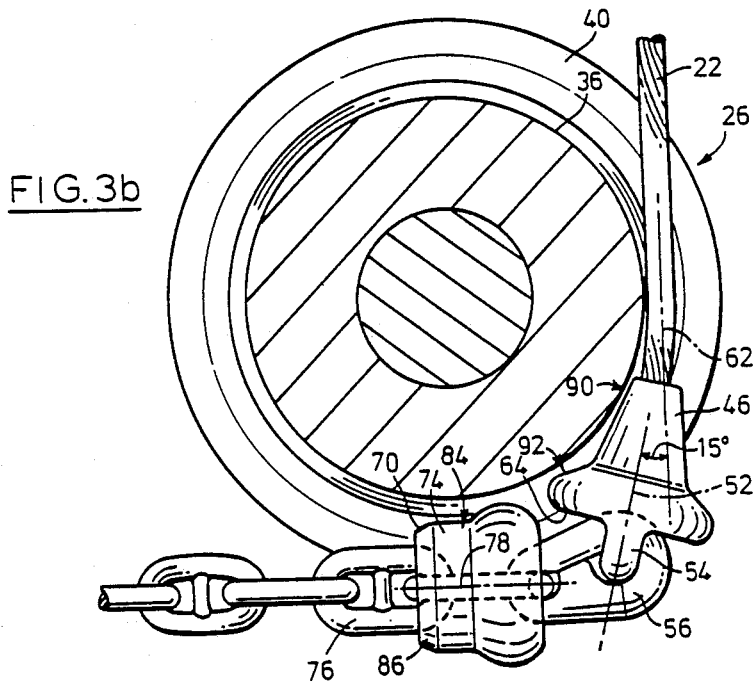
Figure 3C:
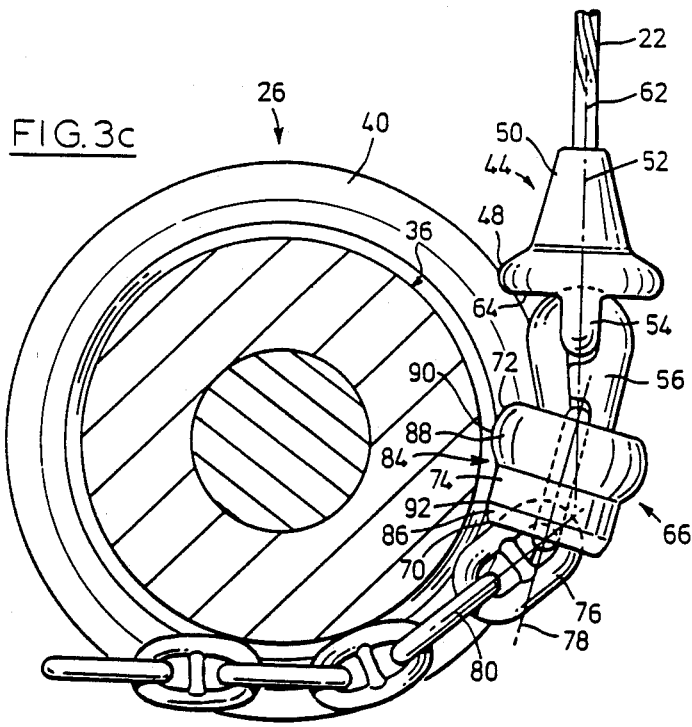
Figure 4:
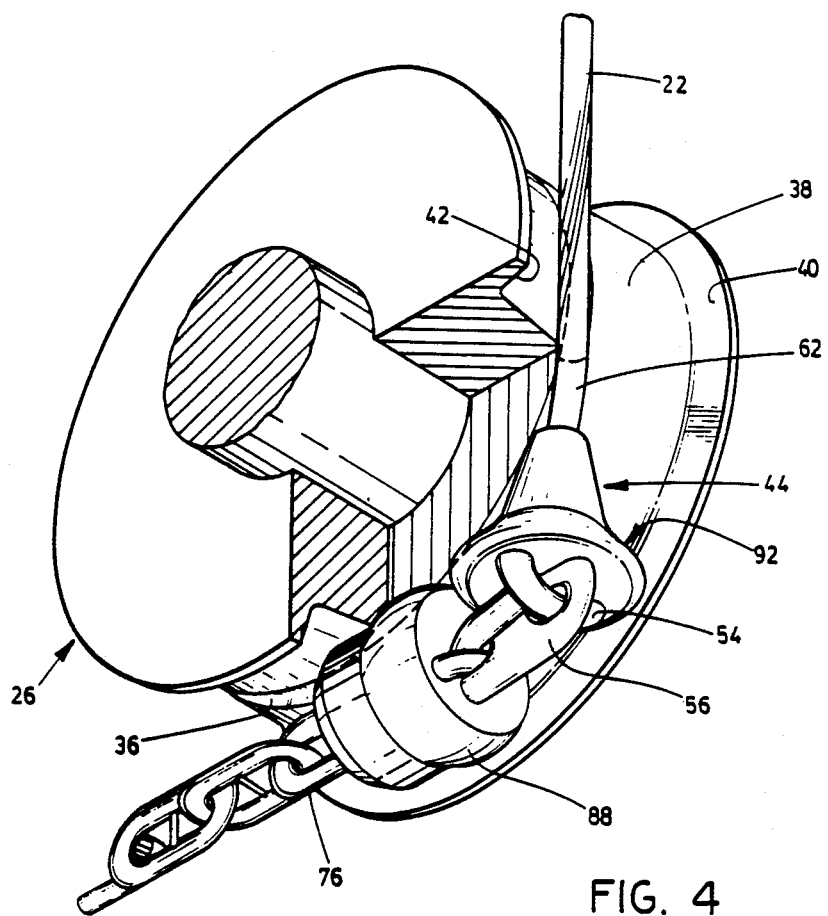

The connector 44, specifically the outer surface portion 50, is shaped to seat against the broad fairlead sheave groove 38 in a predetermined orientation. More specifically, a two-point contact is formed at points 58, 60 between the outer surface portion 50 and the broad groove 38, as indicated in FIG. 3b. This type of contact can be consistently formed because of the radial symmetry of the outer surface portion 50, and its generally convex curvilinear shape. The connector 44 is dimensioned to ensure that a predetermined, maximum bend angle is formed between the wire rope end 62, and the longitudinal connector axis 52, which, as illustrated, is in the order of fifteen degrees. It will be apparent that during hauling in of the anchor line 20, with the wire rope 22 wrapped in the fairlead sheave wire rope groove 36, movement of the connector 44 relative to the fairlead sheave 26 will be so biased that the outer surface portion 50 tends always to engage the broad sheave groove 38, thereby ensuring that the connector 44 always assumes the required predetermined position in which rope bend angle is fixed at an acceptable level.

During paying out, however, absent any other biasing means, the connector end surface 64 and the end chain link 56, in part due to their pivotal connection, will tend to engage the broad groove 38, each time the connector 44 approaches the fairlead sheave 26. This can cause the connector 44 to lock in a position directed substantially radially from the sheave 26 with very severe bending of the rope end 62, as the rope 22 wraps about the fairlead sheave 26.

A collar 66 fitted about the chain link 68 penultimate to the large connector end portion 48 ensures that the connector 44 engages the fairlead sheave 26 in the required predetermined orientation, during paying out. The collar 66 is positioned about the chain line 24 at a predetermined distance so selected that together with the radial dimension of the collar 66, the large connector end portion 48 is displaced from the broad sheave groove 38 when the collar 66 initially contacts the fairlead sheave 26 during paying out. The connector 44 then pivots under the influence of the wire rope 22 until its outer surface portion 50 engages the broad groove 38, ensuring that the connector 44 assumes the required predetermined position.

The collar 66 is a split member comprising two opposing annular collar portions 70, 72 spaced by an intermediate collar portion 74. The various collar portions are bolted together in a conventional manner to define the collar 66. The opposing collar portions 70, 72 are dimensioned to slip over opposing ends of the penultimate link 68, and have internal surfaces conforming generally to the outer curvature of the link 68. Accordingly, when bolted together, the collar 66 is secured against axial movement relative to the link 68. The other link 76 inter-linked with the penultimate link 68 is a detachable link which can be disengaged to permit access to the collar 66 for disconnection of its parts in the event that repairs are required.

The presence of the collar 66 introduces bending moments, applied to the end link 56, the penultimate link 68 and the detachable link 76 which would not otherwise be encountered during passage over the fairlead sheave 26. These bending moments arise due to displacement of the penultimate link 68 radially from the position it would otherwise assume against the fairlead sheave 26, and an increase in the angle formed between the longitudinal axis 78 of the penultimate link and each of the longitudinal axis 80, 82 respectively of the detachable link 76 and the end link 56. To avoid excessive bending moments being applied at any particular one of the links, the circumferential periphery 84 of the collar is shaped to equalize the angle formed between the penultimate link axis 78 and the longitudinal axes 80, 82 of the adjoining links. To that end, the annular collar portion 70, relatively distant from the connector 44, has a radially narrow annular surface portion 86, and the annular collar portion 72 has a radially broad annular surface portion 88. The radial dimension of the intermediate collar portion 74 does not exceed that of the annular collar portion 70, thereby permitting a two-point contact to be formed, for example, at 90, 92 between the narrow and broad annular surface portions 86, 88 and the broad groove 38 of the fairlead sheave 26. The radial dimensions of the narrow and broad surface portions are so selected that, when the wire rope and chain cable have wrapped about the fairlead sheave 26, and the collar 66 has positioned itself against the braod groove 38, the angles formed between the longitudinal axis 78 of the penultimate link 68 and the axes of the adjoining links are substantially equal.

It will be appreciated that a particular embodiment of the invention has been described, and that modifications made be made therein without departing from the spirit of the invention or the scope of the appended claims.

We claim:

1. An anchoring system for a floating structure, comprising:
   an anchor;
   an anchor line including a chain cable and a wire rope, the chain cable being connected to the anchor;
   a fairlead sheave mounted on the floating structure, the fairlead sheave having a central hub defining a wire rope groove, a broader groove extending from opposing sides of the wire rope groove, and a pair of circumferential flanges extending radially outwardly from opposing sides of the broader groove;
   winch and windlass means mounted on the structure for hauling in and paying out the anchor line over the fairlead sheave;
   a connector having a narrow end portion in which an end of the rope is rigidly retained, a broad end portion at which an end link of the chain cable is pivotally retained, and a radially symmetric outer surface portion extending between the narrow and broad end portions;
   the connector being so shaped that the narrow end portion and the broad end portion can simultaneously seat against the central hub in a predetermined orientation in which a predetermined bend angle is formed between the connector and the wire rope end whenever the outer surface portion of the connector engages the central hub; and,
   biasing means for biasing movement of the connector relative to the fairlead sheave at least during paying out of the anchor line such that the connector seats against the central hub in the predetermined orientation whenever the connector engages the fairlead sheave and the wire rope engages the wire rope groove, the biasing means including a collar fitted about the chain cable a predetermined distance from the connector and dimensioned to maintain the broad connector end portion displaced from the fairlead sheave whenever the collar engages the fairlead sheave during paying out of the chain cable over the fairlead sheave until the outer surface portion is drawn by the wire rope into engagement with the fairlead sheave.

2. The anchoring system of claim 1 in which:
   the chain comprises a penultimate link attached to the end link and another link attached to the penultimate link;
   the collar is fitted about the penultimate link;
   the collar has a broad circumferential surface portion relatively proximate to the broad connector end portion and a narrow circumferential surface portion relatively distant from the broad connector end portion, each of the broad and narrow circumferential surface portions being radially symmetric;
   the collar is so shaped that the narrow and broad circumferential surface portions seat against the broader groove of the fairlead sheave when the collar engages the sheave during hauling in and paying out of the anchor line; and,
   the narrow and broad surface portions are so dimensioned radially that the longitudinal axis of the end link and the longitudinal axis of the other link respectively form first and second angles relative to the longitudinal axis of the penultimate link when the wire rope and chain cable wrap the fairlead sheave, the first and second angles having substantially the same magnitude.

3. In an anchoring system for a floating structure, including an anchor, an anchor line having a chain cable connected to the anchor and having a wire rope, a fairlead sheave having a central hub, and winch and windlass means for hauling in and paying out the anchor line over the fairlead sheave, improved means for guiding the anchor line over the fairlead sheave, comprising:
   a connector having a narrow end portion in which an end of the rope is rigidly retained and a broad end portion at which an end link of the chain cable is pivotally retained;
   the connector being so shaped that the narrow end portion and the braod end portion simultaneously seat against the central hub in a predetermined orientation in which a predetermined bend angle is formed between the connector and the wire rope end whenever the narrow and broad connector end portions engage the central hub; and,
   biasing means for biasing movement of the connector relative to the fairlead sheave at least during paying out of the anchor line such that the connector seats against the hub in the predetermined orientation when the connector engages the fairlead sheave and the wire rope engages the wire rope groove, the biasing means including a collar fitted about the chain cable a predetermined distance from the connector and dimensioned to maintain the broad connector end portion displaced from the fairlead sheave whenever the collar engages the fairlead sheave during paying out of the chain cable over the fairlead sheave until the narrow and broad connector end portions are both drawn by the wire rope into engagement with the central hub.

4. The improved guiding means of claim 3 in which:
   the chain comprises a penultimate link attached to the end link and another link attached to the penultimate link;
   the collar is fitted about the penultimate link;
   the collar has a broad circumferential surface portion relatively proximate to the broad connector end portion and a narrow circumferential surface portion relatively distant from the broad connector end portion, each of the broad and narrow circumferential surface portions being radially symmetric;

the collar is so shaped that the narrow and broad circumferential surface portions seat against the broader groove of the fairlead sheave when the collar engages the sheave during hauling in and paying out of the anchor line; and, the narrow and broad surface portions are so dimensioned radially that the longitudinal axis of the end link and the longitudinal axis of the other link respectively form first and second angles relative to the longitudinal axis of the penultimate link when the wire rope and chain cable wrap the fairlead sheave, the first and second angles having substantially the same magnitude.

5. The improved guiding means of claim 3 in which the connector has an outer surface portion extending between the narrow and broad connector end portions which is radially symmetric about a longitudinal axis through the narrow and broad connector end portions and which is generally concave.

* * * * *